US012764582B2

(12) United States Patent
Wang et al.

(10) Patent No.: US 12,764,582 B2
(45) Date of Patent: Oct. 13, 2026

(54) DESIGNS FOR REDUCING ERROR PROPAGATION OF CHANNEL STATE INFORMATION (CSI) DIFFERENTIAL REPORTS

(71) Applicant: QUALCOMM Incorporated, San Diego, CA (US)

(72) Inventors: Runxin Wang, San Diego, CA (US); Yu Zhang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/570,317

(22) PCT Filed: Aug. 20, 2021

(86) PCT No.: PCT/CN2021/113816
§ 371 (c)(1),
(2) Date: Dec. 14, 2023

(87) PCT Pub. No.: WO2023/019564
PCT Pub. Date: Feb. 23, 2023

(65) Prior Publication Data
US 2024/0292255 A1 Aug. 29, 2024

(51) Int. Cl.
*H04W 24/10* (2009.01)
*H04W 28/04* (2009.01)

(52) U.S. Cl.
CPC .......... *H04W 24/10* (2013.01); *H04W 28/04* (2013.01)

(58) Field of Classification Search
CPC .............................. H04W 28/04; H04W 24/10
See application file for complete search history.

(56) References Cited

U.S. PATENT DOCUMENTS 10,187,876 B2 1/2019 Chen et al.
2012/0329502 A1* 12/2012 Frederiksen .......... H04L 1/0026 455/509

(Continued)

FOREIGN PATENT DOCUMENTS

WO 2013171152 A1 11/2013
WO 2016114917 7/2016

(Continued)

OTHER PUBLICATIONS

International Search Report and Written Opinion—PCT/CN2021/113816—ISA/EPO—May 12, 2022.

(Continued)

*Primary Examiner* — Kenny S Lin
(74) *Attorney, Agent, or Firm* — QUALCOMM Incorporated

(57) ABSTRACT

Certain aspects of the present disclosure provide a method for wireless communication by a user equipment (UE). The UE receives first signaling triggering the UE to transmit a base channel state information (CSI) report to a network entity. The UE transmits the base CSI report to the network entity in response to the first signaling. The UE takes action to reduce or avoid error propagation when transmitting one or more differential CSI reports that include at least some CSI values reported relative to CSI values in the base CSI report.

20 Claims, 17 Drawing Sheets

(56) References Cited

U.S. PATENT DOCUMENTS

| | | | | |
|---|---|---|---|---|
| 2013/0322376 | A1* | 12/2013 | Marinier | H04L 1/0027 370/329 |
| 2015/0189644 | A1* | 7/2015 | Lorca Hernando | H04L 5/0055 370/329 |
| 2017/0013641 | A1* | 1/2017 | Patel | H04L 1/1671 |
| 2017/0201308 | A1* | 7/2017 | Park | H04W 16/14 |
| 2018/0167116 | A1* | 6/2018 | Rahman | H04B 7/0639 |
| 2019/0190582 | A1* | 6/2019 | Guo | H04B 17/327 |
| 2019/0312668 | A1* | 10/2019 | Park | H04L 5/0057 |
| 2020/0059282 | A1* | 2/2020 | Wu | H04B 7/0626 |
| 2020/0244331 | A1* | 7/2020 | Karri | H04B 7/0417 |
| 2021/0127387 | A1* | 4/2021 | Huang | H04L 5/001 |
| 2021/0211225 | A1 | 7/2021 | Yuan et al. | |
| 2021/0274578 | A1* | 9/2021 | Yum | H04L 1/0001 |
| 2021/0409174 | A1* | 12/2021 | Yum | H04L 5/0048 |
| 2022/0052735 | A1* | 2/2022 | Yang | H04L 1/0026 |
| 2022/0077909 | A1* | 3/2022 | Ma | H04W 72/23 |
| 2022/0149908 | A1* | 5/2022 | Gao | H04B 7/0645 |
| 2022/0263557 | A1* | 8/2022 | Gonuguntla | H04B 7/0695 |
| 2023/0056263 | A1* | 2/2023 | Kim | H04B 7/0456 |
| 2023/0112322 | A1* | 4/2023 | Duan | H04W 64/00 455/456.1 |
| 2023/0247623 | A1* | 8/2023 | Hao | H04W 72/02 370/329 |
| 2023/0283342 | A1* | 9/2023 | Ahmed Salem | H04B 7/066 370/329 |
| 2023/0361967 | A1* | 11/2023 | Sun | H04B 7/0628 |
| 2024/0039598 | A1* | 2/2024 | Kim | H04L 25/0224 |
| 2024/0292255 | A1* | 8/2024 | Wang | H04L 1/0029 |

FOREIGN PATENT DOCUMENTS

| | | | |
|---|---|---|---|
| WO | 2020164039 | 8/2020 | |
| WO | WO-2020164039 A1 * | 8/2020 | H04L 5/0057 |

OTHER PUBLICATIONS

Samsung: "Differential Reporting for Type II CSI", 3GPP TSG RAN WG1 Meeting #91, R1-1720298, 3rd Generation Partnership Project, Mobile Competence Centre, 650, Route Des Lucioles, F-06921 Sophia-Antipolis, Cedex, France, vol. RAN WG1, No. Athens, Greece, Reno, USA, Nov. 27-Dec. 1, 2017, XP051368947, 7 Pages, Nov. 17, 2017 (Nov. 17, 2017), Sections 1-3, the whole document.

* cited by examiner

DESIGNS FOR REDUCING ERROR PROPAGATION OF CHANNEL STATE INFORMATION (CSI) DIFFERENTIAL REPORTS

CROSS-REFERENCE TO RELATED APPLICATIONS

This application is a national stage application under 35 U.S.C. 371 of PCT/CN2021/113816, filed Aug. 20, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for managing channel state information (CSI) reports.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for managing channel state information (CSI) reports.

Certain aspects of the subject matter described in this disclosure can be implemented in a method for wireless communications by a user equipment (UE). The method generally includes receiving first signaling triggering the UE to transmit a base CSI report to a network entity; transmitting the base CSI report to the network entity in response to the first signaling; and taking action to reduce or avoid error propagation when transmitting one or more differential CSI reports that include at least some CSI values reported relative to CSI values in the base CSI report.

Certain aspects of the subject matter described in this disclosure can be implemented in an apparatus for wireless communications by a UE. The apparatus generally includes at least one application processor and a memory configured to: receive first signaling triggering the UE to transmit a base CSI report to a network entity; transmit the base CSI report to the network entity in response to the first signaling; and take action to reduce or avoid error propagation when transmitting one or more differential CSI reports that include at least some CSI values reported relative to CSI values in the base CSI report.

Certain aspects of the subject matter described in this disclosure can be implemented in an apparatus for wireless communications by a UE. The apparatus generally includes means for receiving first signaling triggering the UE to transmit a base CSI report to a network entity; means for transmitting the base CSI report to the network entity in response to the first signaling; and means for taking action to reduce or avoid error propagation when transmitting one or more differential CSI reports that include at least some CSI values reported relative to CSI values in the base CSI report.

Certain aspects of the subject matter described in this disclosure can be implemented in a computer readable medium storing computer executable code thereon for wireless communications by a UE. The computer readable medium generally includes code for receiving first signaling triggering the UE to transmit a base CSI report to a network entity; code for transmitting the base CSI report to the network entity in response to the first signaling; and code for taking action to reduce or avoid error propagation when transmitting one or more differential CSI reports that include at least some CSI values reported relative to CSI values in the base CSI report.

Certain aspects of the subject matter described in this disclosure can be implemented in a method for wireless communications by a UE. The method generally includes transmitting a plurality of CSI reports to a network entity, the plurality of CSI reports comprising a base CSI report and at least one differential CSI report that includes at least some CSI values reported relative to CSI values in the base CSI report; and retransmitting at least one of the base CSI report or differential CSI reports, in accordance with signaling received from the network entity.

Certain aspects of the subject matter described in this disclosure can be implemented in an apparatus for wireless communications by a UE. The apparatus generally includes at least one application processor and a memory configured to: transmit a plurality of CSI reports to a network entity, the plurality of CSI reports comprising a base CSI report and at least one differential CSI report that includes at least some CSI values reported relative to CSI values in the base CSI report; and retransmit at least one of the base CSI report or differential CSI reports, in accordance with signaling received from the network entity Certain aspects of the subject matter described in this disclosure can be implemented in an apparatus for wireless communications by a UE. The apparatus generally includes means for transmitting a plurality of CSI reports to a network entity, the plurality of CSI reports comprising a base CSI report and at least one differential CSI report that includes at least some CSI values reported relative to CSI values in the base CSI report; and means for retransmitting at least one of the base CSI report or differential CSI reports, in accordance with signaling received from the network entity Certain aspects of the subject matter described in this disclosure can be implemented in a computer readable medium storing computer executable code thereon for wireless communications by a UE. The computer readable medium generally includes code for transmitting a plurality of CSI reports to a network entity, the plurality of CSI reports comprising a base CSI report and at least one differential CSI report that includes at least some CSI values reported relative to CSI values in the base CSI report; and code for retransmitting at least one of the base CSI report or differential CSI reports, in accordance with signaling received from the network entity Certain aspects of the subject matter described in this disclosure can be implemented in a method for wireless communications by a network entity. The method generally includes receiving a plurality of CSI reports from a UE, the plurality of CSI reports comprising a base CSI report and at least one differential CSI report that includes at least some CSI values reported relative to CSI values in the base CSI report; transmitting signaling to the UE to retransmit at least one of the base CSI report or differential CSI reports; and receiving, from the UE, retransmission of at least one of the base CSI report or the differential CSI reports, in accordance with the signaling.

Certain aspects of the subject matter described in this disclosure can be implemented in an apparatus for wireless communications by a network entity. The apparatus generally includes at least one application processor and a memory configured to: receive a plurality of CSI reports from a UE, the plurality of CSI reports comprising a base CSI report and at least one differential CSI report that includes at least some CSI values reported relative to CSI values in the base CSI report; transmit signaling to the UE to retransmit at least one of the base CSI report or differential CSI reports; and receive, from the UE, retransmission of at least one of the base CSI report or the differential CSI reports, in accordance with the signaling.

Certain aspects of the subject matter described in this disclosure can be implemented in an apparatus for wireless communications by a network entity. The apparatus generally includes means for receiving a plurality of CSI reports from a UE, the plurality of CSI reports comprising a base CSI report and at least one differential CSI report that includes at least some CSI values reported relative to CSI values in the base CSI report; means for transmitting signaling to the UE to retransmit at least one of the base CSI report or differential CSI reports; and means for receiving, from the UE, retransmission of at least one of the base CSI report or the differential CSI reports, in accordance with the signaling.

Certain aspects of the subject matter described in this disclosure can be implemented in a computer readable medium storing computer executable code thereon for wireless communications by a network entity. The computer readable medium generally includes code for receiving a plurality of CSI reports from a UE, the plurality of CSI reports comprising a base CSI report and at least one differential CSI report that includes at least some CSI values reported relative to CSI values in the base CSI report; code for transmitting signaling to the UE to retransmit at least one of the base CSI report or differential CSI reports; and code for receiving, from the UE, retransmission of at least one of the base CSI report or the differential CSI reports, in accordance with the signaling.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
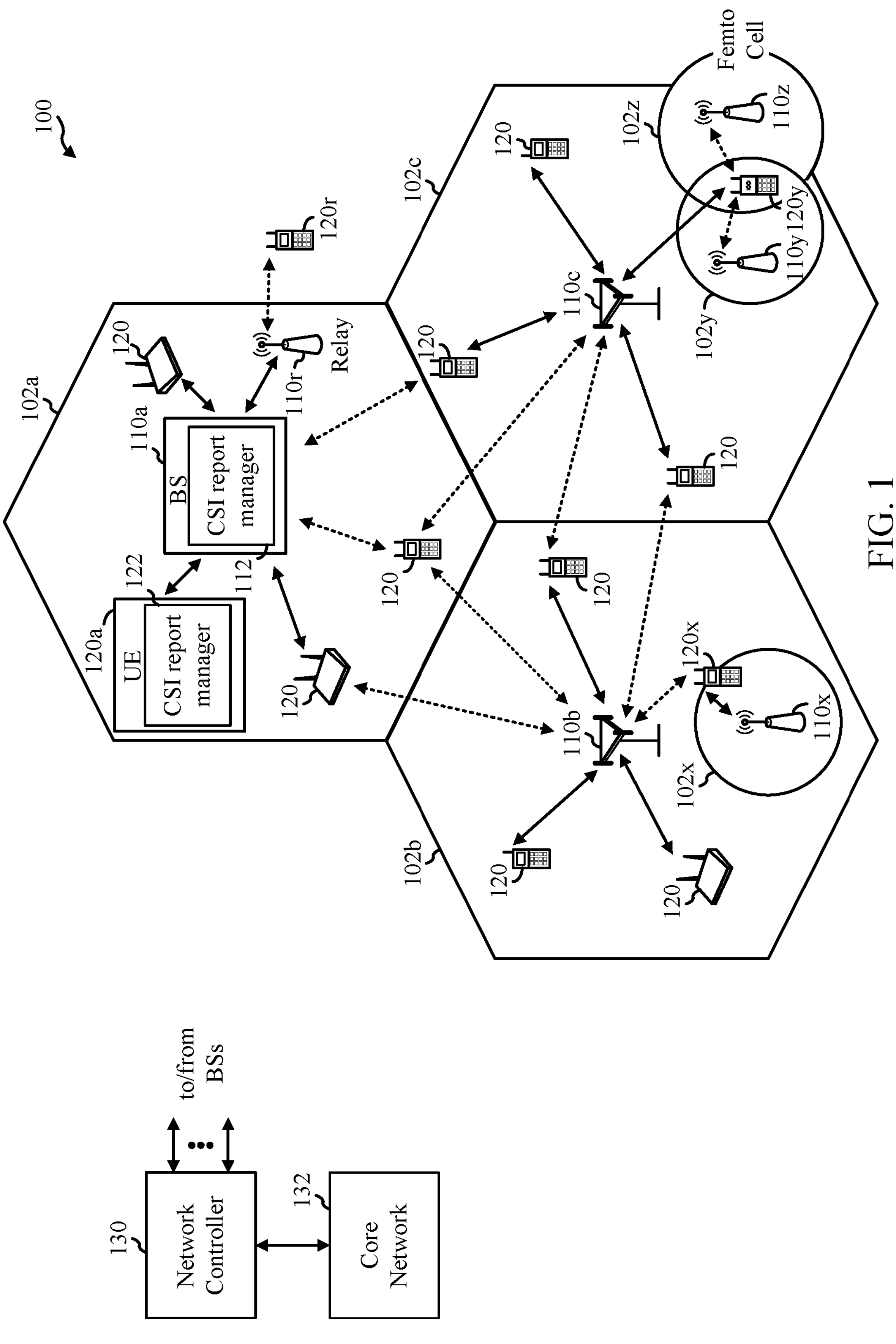
FIG. 1 is a block diagram conceptually illustrating an example wireless communication network, in accordance with certain aspects of the present disclosure.

Aspects of the present disclosure provide apparatuses, methods, processing systems, and computer readable mediums for managing differential channel state information (CSI) reports. In such cases, a user equipment (UE) may send a base CSI report and multiple differential CSI reports to a network entity. A differential CSI report is calculated based on the base CSI report/previous CSI report using differential or other functions. While calculating and sending the differential CSI reports, the UE may implement techniques described herein to reduce or avoid error propagation.

The following description provides examples of designs for reducing error propagation of CSI differential reports in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3rd generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHZ). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing channel state information (CSI) reports. As shown in FIG. 1, a UE 120*a* includes a CSI manager 122 configured to perform operations 600 of FIG. 6 and operations 1000 of FIG. 10, and a BS 110*a* includes a CSI manager 112 configured to perform operations 1100 of FIG. 11.

The wireless communication network 100 may be a new radio (NR) system (e.g., a 5th generation (5G) NR network). As shown in FIG. 1, the wireless communication network 100 may be in communication with a core network. The core network may in communication with BSs 110*a-z* (each also individually referred to herein as a BS 110 or collectively as BSs 110) and/or UEs 120*a-y* (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS 110 may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
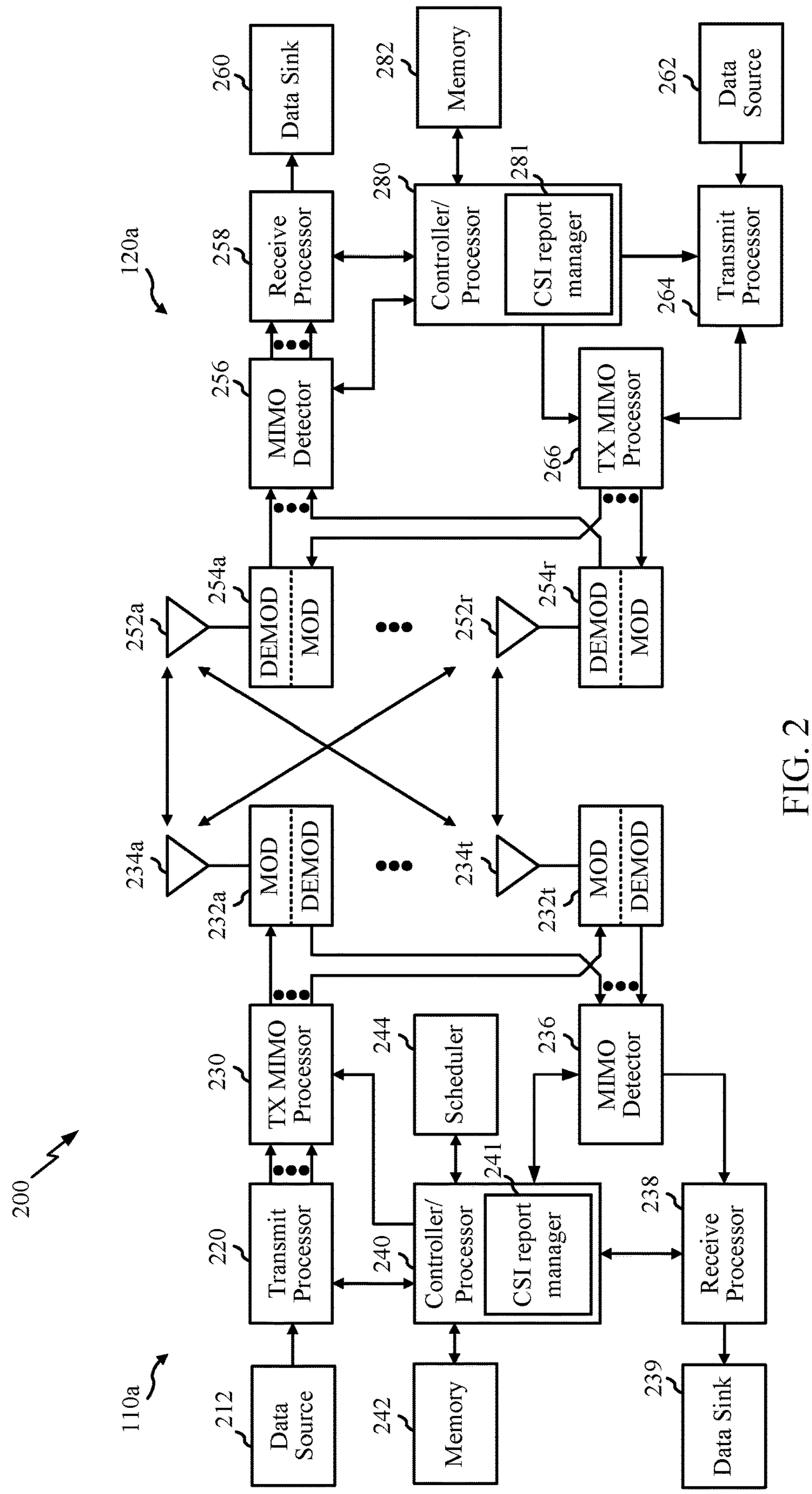
FIG. 2 is a block diagram conceptually illustrating a design of an example base station (BS) and a user equipment (UE), in accordance with certain aspects of the present disclosure.

FIG. 2 illustrates example components of a BS 110*a* and a UE 120*a* (e.g., in the wireless communication network 100 of FIG. 1).

At the BS 110*a*, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232*a*-232*t*. Each MOD in transceivers 232*a*-232*t* may process a respective output symbol stream (e.g., for orthogonal frequency division multiplexing (OFDM), etc.) to obtain an output sample stream. Each MOD in transceivers 232*a*-232*t* may further process (e.g., convert to analog, amplify, filter, and upconvert) the output sample stream to obtain a downlink (DL) signal. The DL signals from the MODs in transceivers 232*a*-232*t* may be transmitted via antennas 234*a*-234*t*, respectively.

At the UE 120*a*, antennas 252*a*-252*r* may receive DL signals from the BS 110*a* and may provide received signals to demodulators (DEMODs) in transceivers 254*a*-254*r*, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On an uplink (UL), at the UE 120*a*, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254*a*-254*r* (e.g., for SC-FDM, etc.), and transmitted to the BS 110*a*. At the BS 110*a*, the UL signals from the UE 120*a* may be received by the antennas 234, processed by the DEMODs in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Memories 242 and 282 may store data and program codes for the BS 110*a* and the UE 120*a*, respectively. A scheduler 244 may schedule the UE 120*a* for data transmission on a DL and/or an UL.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a CSI manager 241 that may be configured to perform the operations illustrated in FIG. 11, as well as other operations disclosed herein. As shown in FIG. 2, the controller/processor 280 of the UE 120*a* has a CSI manager 281 that may be configured to perform the operations illustrated in FIG. 6 and FIG. 10, as well as other operations disclosed herein. Although shown at the controller/processor, other components of the UE 120*a* and the BS 110*a* may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
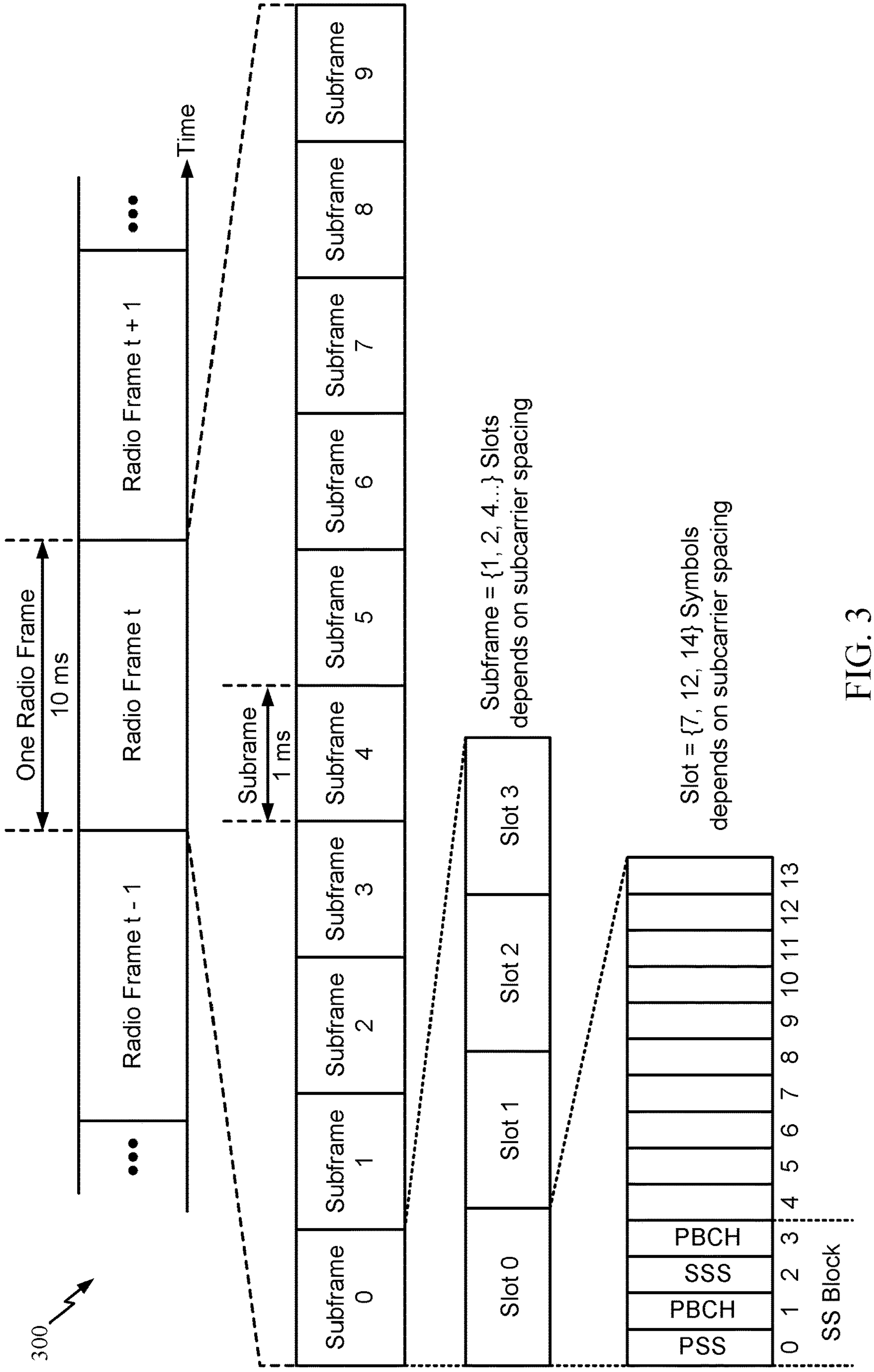
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Designs for Reducing Error Propagation of CSI Reports

Figure 4:
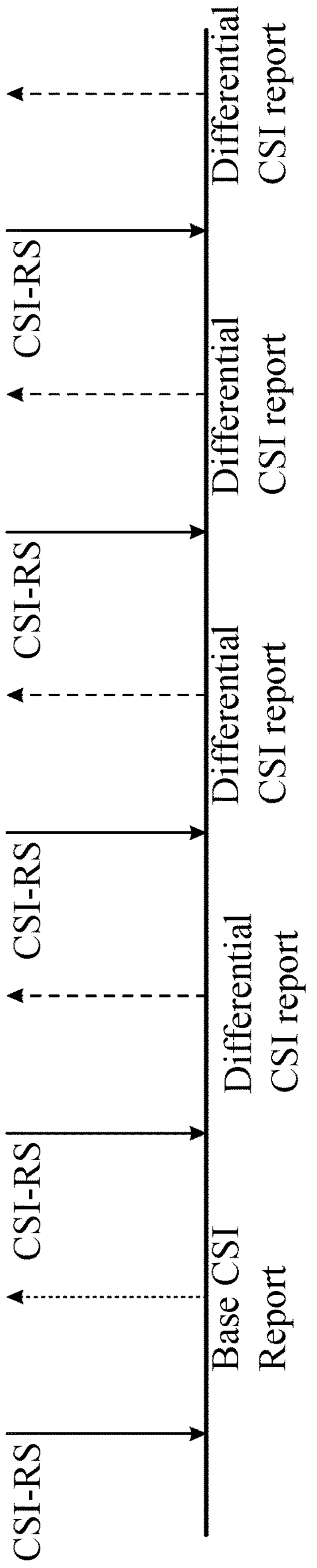
FIG. 4 illustrates transmission of a base channel state information (CSI) report and multiple differential CSI reports.

A user equipment (UE) sends channel feedback via channel state information (CSI) reports to a network entity. As illustrated in FIG. 4, a UE sends a base CSI report (including CSI values) to the network entity, in response to receiving first signaling (e.g., a CSI-reference signal (CSI-RS)) triggering the UE to transmit a CSI report. After sending the base CSI report, the UE sends differential CSI reports (also known as delta CSI reports) to the network entity, in response to receiving CSI-RSs triggering the UE to transmit CSI reports. The UE may calculate a differential CSI report based on the base CSI report/previous CSI report using differential or other functions. The differential CSI report may include some CSI values relative to the CSI values in the base CSI report/previous CSI report.

Figure 5:
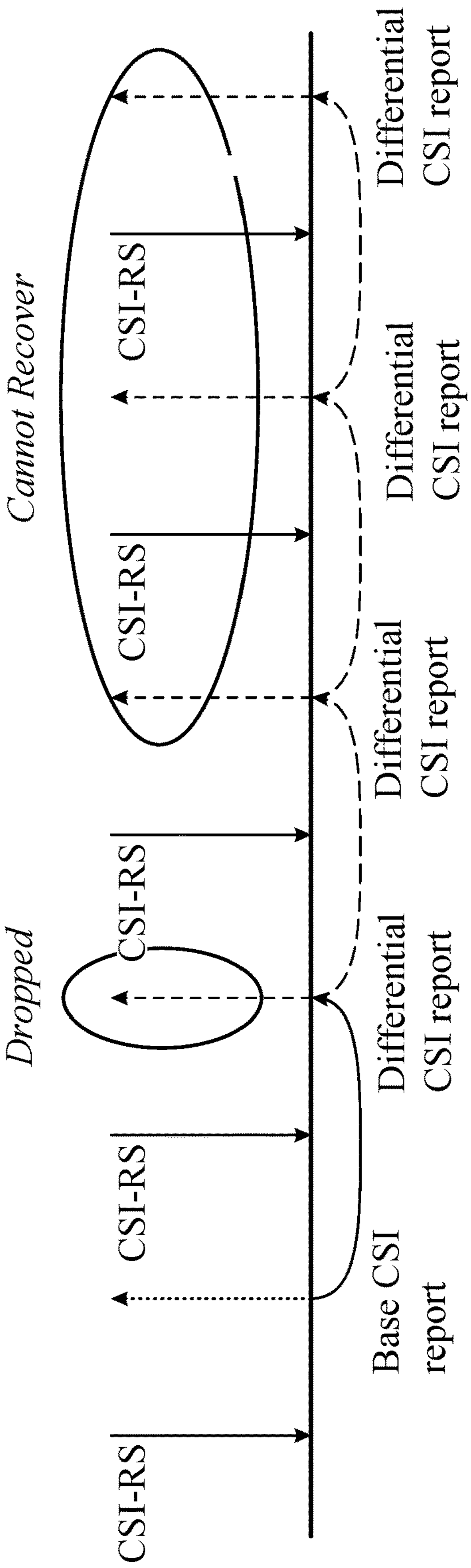
FIG. 5 illustrates an error propagation due to dropping of a differential CSI report.

In some cases, as illustrated in FIG. 5, when one differential CSI report (which is calculated based on a base CSI report) is dropped (e.g., due to a collision with other signaling/channels), the dropped differential CSI report and differential CSI reports following the dropped differential CSI report may be lost and cannot be recovered by the network entity. This error propagation is because each differential CSI report is only based on a previous CSI report.

Aspects of the present disclosure provide apparatuses, methods, processing systems, and computer readable mediums for managing CSI differential reports to reduce or avoid error propagation. For example, the CSI differential reports may be managed based on reference CSI report configurations, constraints on a time gap between transmission of different CSI reports, and a differential CSI report reset procedure.

Figure 6:
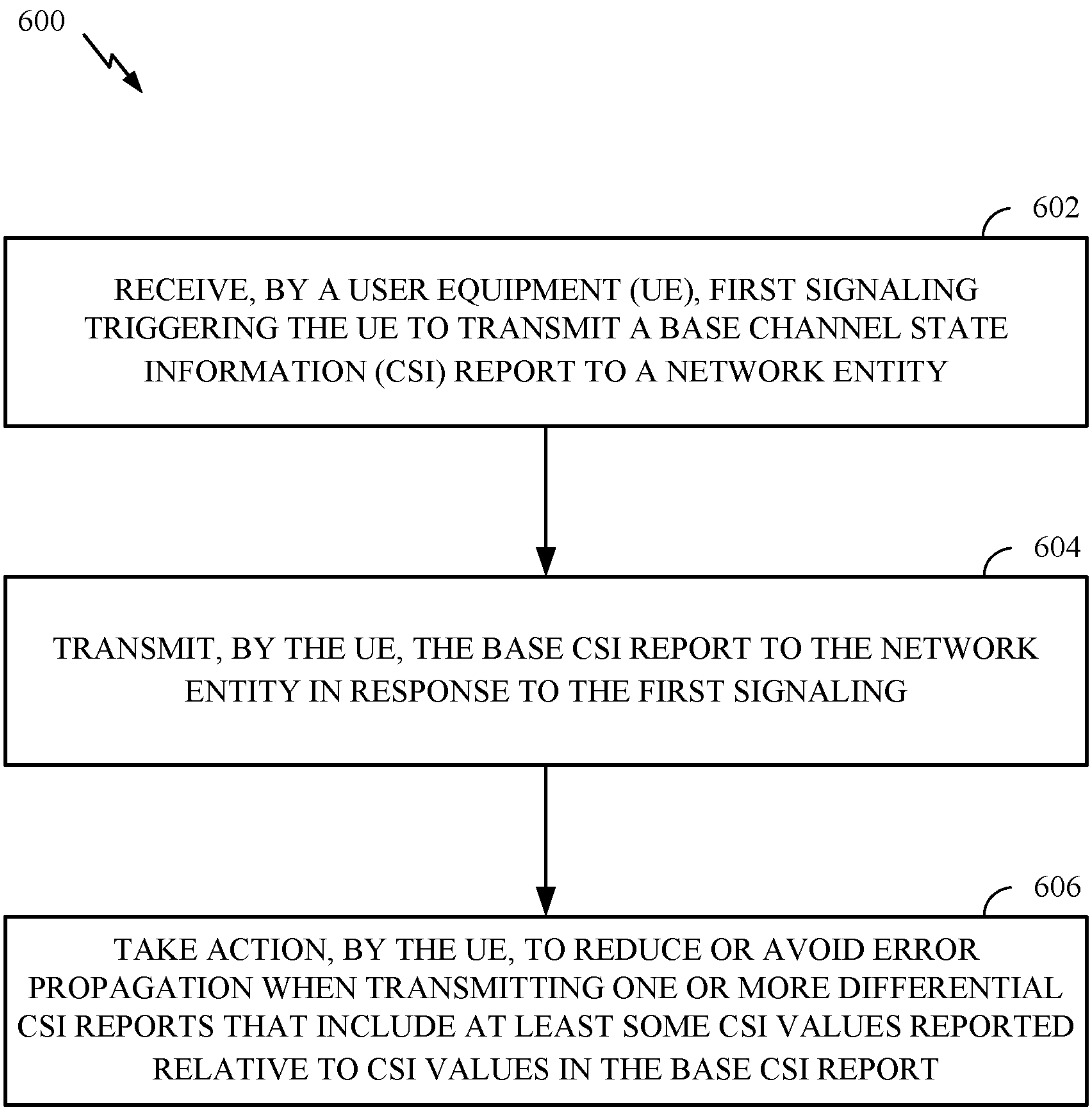
FIG. 6 is a flow diagram illustrating example operations for wireless communications by a UE, in accordance with certain aspects of the present disclosure.

FIG. 6 is a flow diagram illustrating example operations 600 for wireless communication by a UE, in accordance with certain aspects of the present disclosure. The operations 600 may be performed, for example, by the UE 120*a* in the wireless communication network 100. The operations 600 may be implemented as software components that are executed and run on one or more processors (e.g., the controller/processor 280 of FIG. 2). Further, the transmission and reception of signals by the UE in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 602, by receiving first signaling triggering the UE to transmit a base CSI report to a network entity. For example, the UE may receive the first signaling using antenna(s) and receive/transceiver components of the UE 120*a* shown in FIG. 1 or FIG. 2 and/or of the apparatus shown in FIG. 13.

At 604, the UE transmits the base CSI report to the network entity in response to the first signaling. For example, the UE may transmit the base CSI report to the network entity using antenna(s) and transmitter/transceiver components of the UE 120*a* shown in FIG. 1 or FIG. 2 and/or of the apparatus shown in FIG. 13.

At 606, the UE takes action to reduce or avoid error propagation when transmitting one or more differential CSI reports that include at least some CSI values reported relative to CSI values in the base CSI report. For example, the UE may take action when transmitting the one or more differential CSI reports using a processor, antenna(s), and transceiver components of the UE 120*a* shown in FIG. 1 or FIG. 2 and/or of the apparatus shown in FIG. 13.

The operations shown in FIG. 6 may be understood with reference to in FIGS. 7A-9B.

In certain aspects, after a UE transmits a base CSI report to a network entity, the UE receives a second signaling triggering the UE to transmit a differential CSI report to the network entity. In response to the second signaling, the UE calculates the differential CSI report. In one example, the UE may calculate the differential CSI report based on a fixed reference rule. In another example, the UE may calculate the differential CSI report based on a scheduling based reference rule.

Figure 7A:
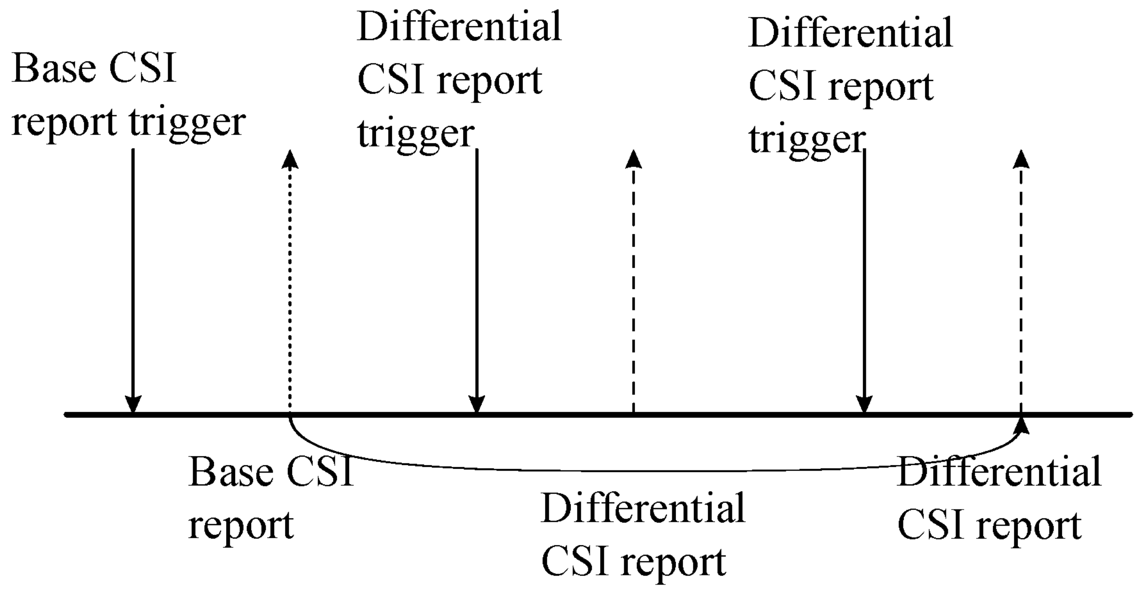
FIGS. 7A-7E illustrate multiple differential CSI reports determined based on a fixed reference rule or a scheduling based reference rule, in accordance with certain aspects of the present disclosure.
Figure 7B:
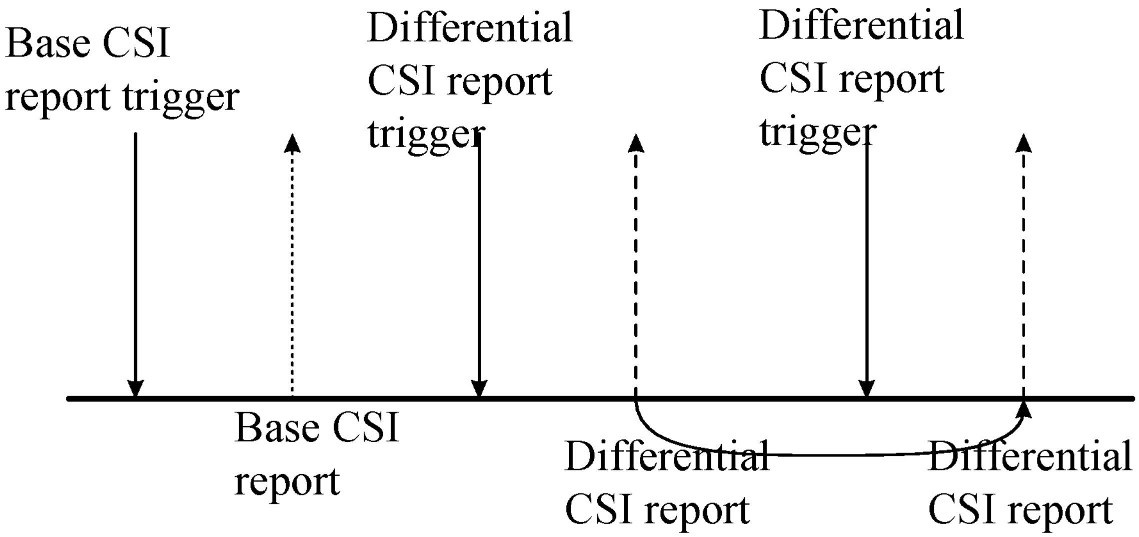

In certain aspects, the UE implements the fixed reference rule to calculate the differential CSI report. Per the fixed reference rule, the UE calculates the differential CSI report based on a predefined reference CSI report. In one example, the fixed reference rule may indicate that the predefined reference CSI report is a latest base CSI report sent by the UE. As illustrated in FIG. 7A, the UE may then calculate the differential CSI report based on the latest base CSI report, and transmit the differential CSI report to the network entity. In another example, the fixed reference rule may indicate that the predefined reference CSI report is a latest differential CSI report sent by the UE. As illustrated in FIG. 7B, the UE may then calculate the differential CSI report based on the latest differential CSI report, and transmit the differential CSI report to the network entity. In another example, the fixed reference rule may indicate that the predefined reference CSI report is a CSI report associated with a predefined ID (e.g., pre-defined report ID). The UE may then calculate the differential CSI report based on the CSI report associated with the predefined ID, and transmit the differential CSI report to the network entity.

In certain aspects, the fixed reference rule indicates the UE to skip the differential CSI report, in response to the second signaling, if the predefined reference CSI report has been dropped. For example, when the UE has to calculate a second differential CSI report based on received signaling, the UE may determine that a first differential CSI report has to be used to calculate the second differential CSI report. The UE may then determine that the first differential CSI report has been dropped. In such a case, the UE may not transmit the second differential CSI report in response to the received signaling.

Figure 7C:
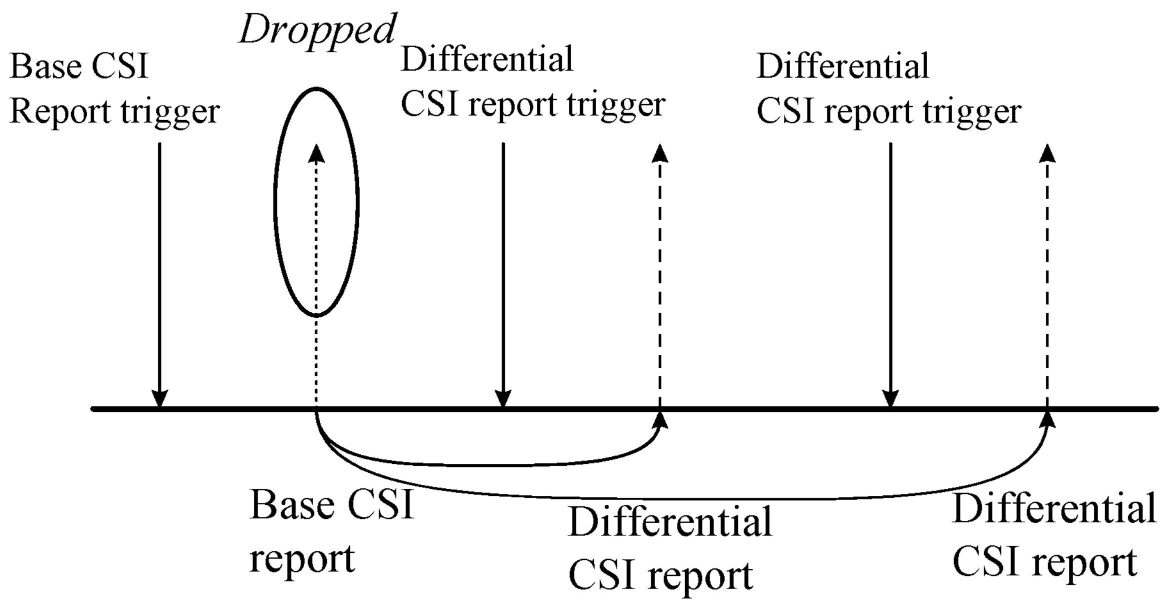

In certain aspects, the UE implements the scheduling based reference rule to calculate the differential CSI report. For example, the UE may implement the scheduling based reference rule when a predefined reference CSI report (e.g., a latest base CSI report) for the differential CSI report has been dropped due to a collision with other signaling/channels (as illustrated in FIG. 7C), and both the UE and the network entity are aware about this collision. As noted above, the predefined reference CSI report may also be a latest differential CSI report, or a CSI report associated with a predefined ID.

Figure 7D:
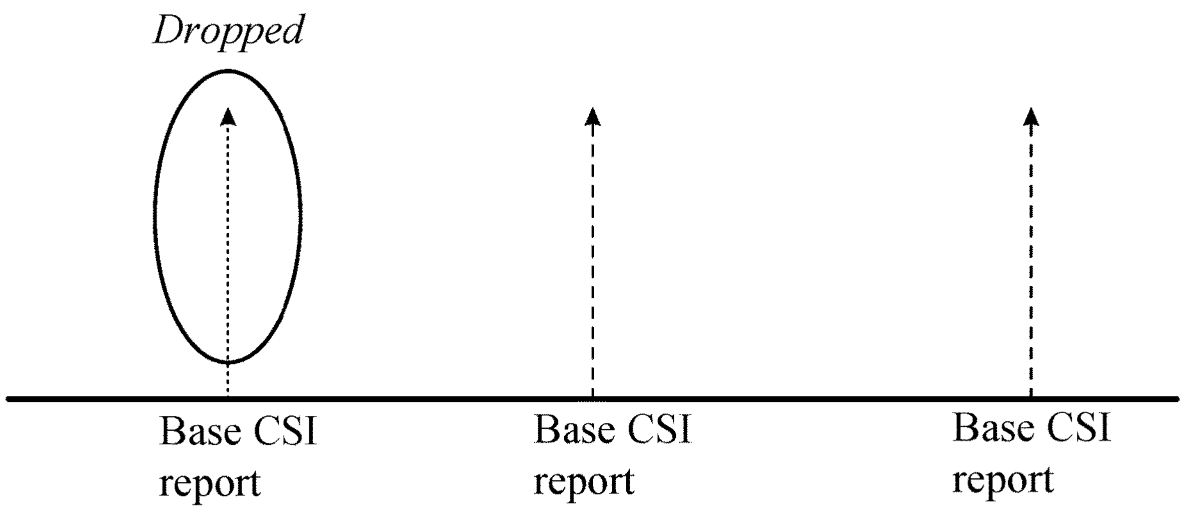
Figure 7E:
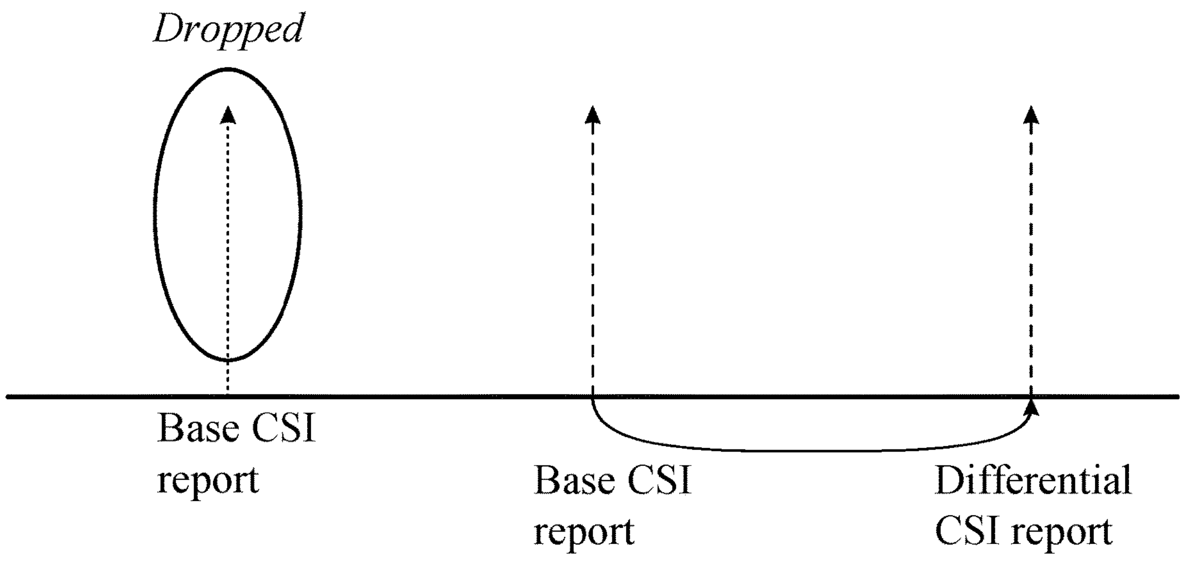

In certain aspects, per the scheduling based reference rule, the UE calculates the differential CSI report based on a latest valid base CSI report (and ignore the dropped predefined reference CSI report), as illustrated in FIG. 7D and FIG. 7E. In certain aspects, per the scheduling based reference rule, the UE calculates the differential CSI report based on a latest valid differential CSI report (and ignore the dropped predefined reference CSI report). The UE may then transmit the differential CSI report to the network entity.

In certain aspects, per the scheduling based reference rule, the UE drops the differential CSI report (e.g., when the predefined reference CSI report has been dropped) and instead transmits a new base CSI report to the network entity. To calculate this new base CSI report, the UE may not use any reference CSI report. In some cases, any new differential CSI reports may be calculated based on this new base CSI report.

In certain aspects, the UE receives a downlink control information (DCI) indicating to reset a differential CSI report procedure (e.g., when the reference CSI report for the differential CSI report is dropped due to a collision, and both the UE and the network entity are aware about this collision). When the differential CSI report procedure is reset, the UE does not send any more differential CSI reports based on a latest base CSI report. Instead, the UE calculates and transmits a new base CSI report to the network entity. In certain aspects, the DCI may indicate to skip the differential CSI report. The UE then does not send the differential CSI report to the network entity.

In certain aspects, after a UE transmits a base CSI report to a network entity, the UE receives a second signaling triggering the UE to transmit a differential CSI report to the network entity. In response to the second signaling, the UE has to calculate and transmit the differential CSI report, within a predetermined time. In certain aspects, when the base CSI report and the differential CSI report are triggered separately, there may not be enough time gap for calculating the differential CSI report. This is because there has to be a predefined constraint minimum/maximum value for the time gap between the base CSI report and the differential CSI report.

Figure 8:
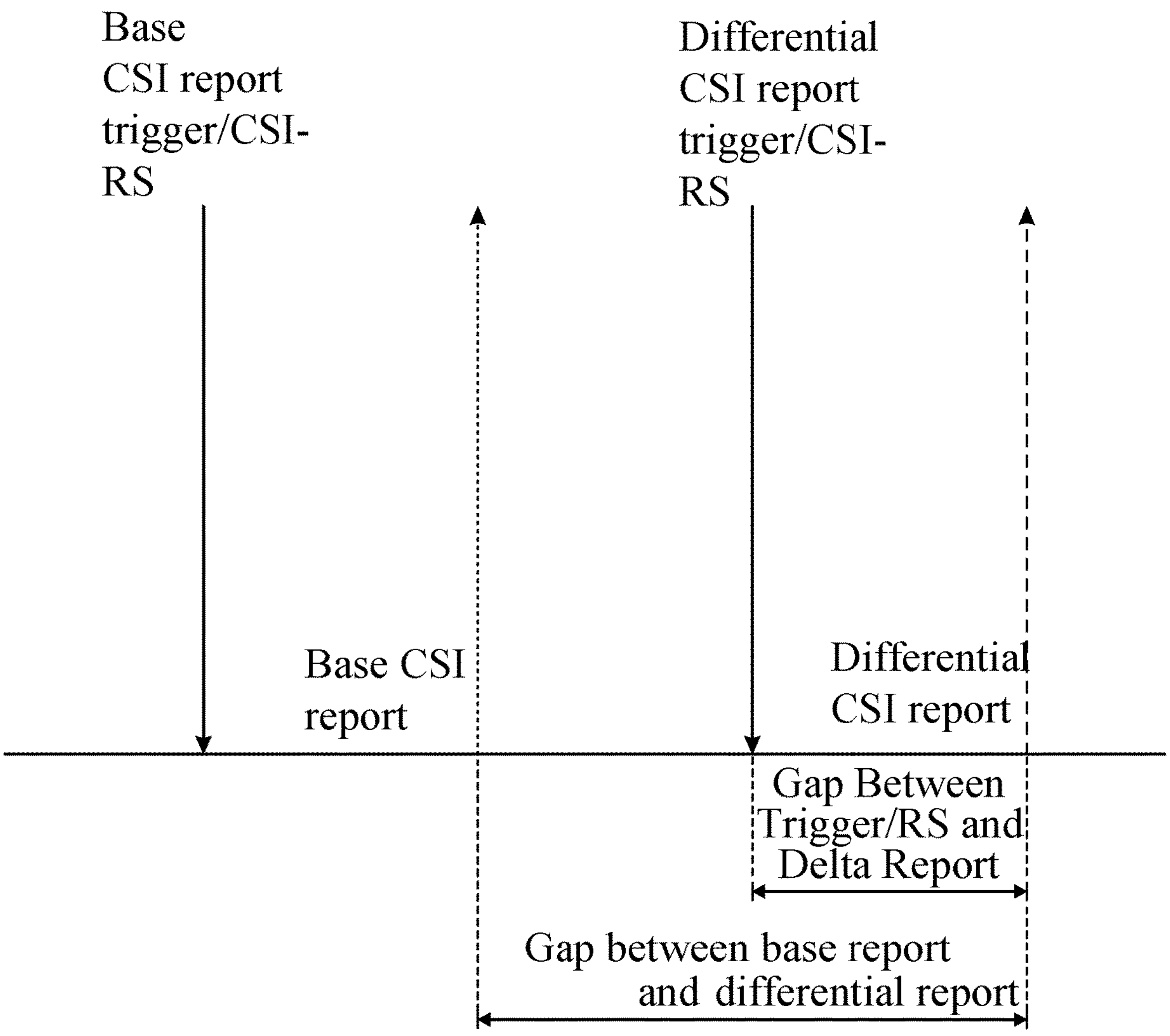
FIG. 8 illustrates a time gap between two CSI reports, in accordance with certain aspects of the present disclosure.

The UE may determine a time gap between transmissions of the base CSI report and the differential CSI report. As illustrated in FIG. 8, the time gap may correspond to a duration between an earlier transmission of the base CSI report and a later transmission of the differential CSI report based on the second signaling. In one example, when the time gap is less than a first threshold (e.g., a predefined constraint minimum value) or more than a second threshold (e.g., a predefined constraint maximum value), the UE may drop the differential CSI report, in response to the second signaling. In another example, when the time gap is less than or more than the second threshold, the UE may generate and transmit a new base CSI report, instead of the differential CSI report, in response to the second signaling.

In certain aspects, a UE receives scheduling information indicating a differential CSI report procedure reset (e.g., based on CSI report trigger settings and reference CSI report settings) from a network entity. When there is the reset of the differential CSI report procedure, the UE sends a new base CSI report and differential CSI reports based on the new base CSI report (instead of the differential CSI reports based on an earlier base CSI report) in response to any signaling for CSI reports. In one example, the scheduling information may be received via a radio resource control (RRC). In another example, the scheduling information may be received via a medium access control (MAC) control element (CE). In another example, the scheduling information may be received via a downlink control information (DCI).

Figure 9A:
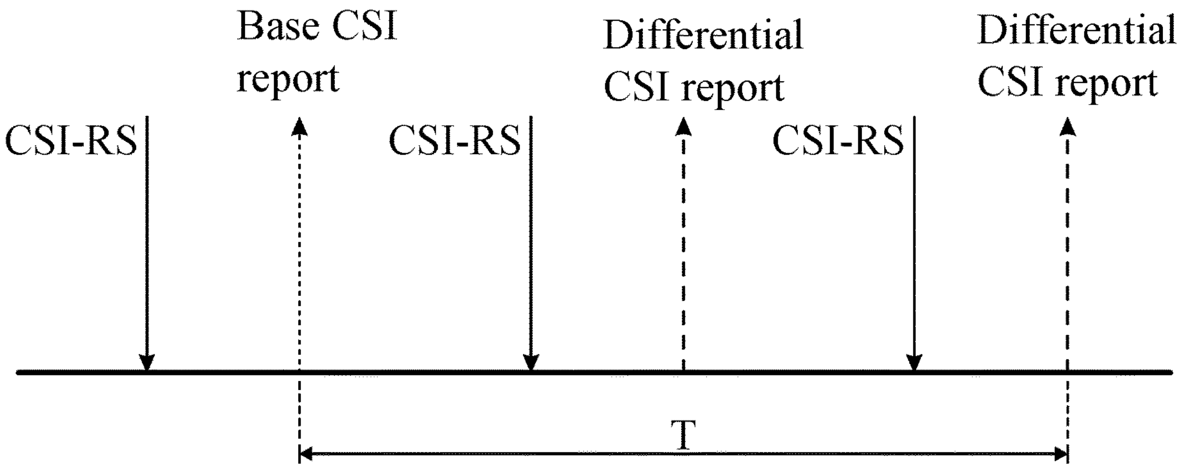
FIGS. 9A-9B illustrate transmission of a base CSI report and differential CSI reports during a predefined time period (T), in accordance with certain aspects of the present disclosure.
Figure 9B:
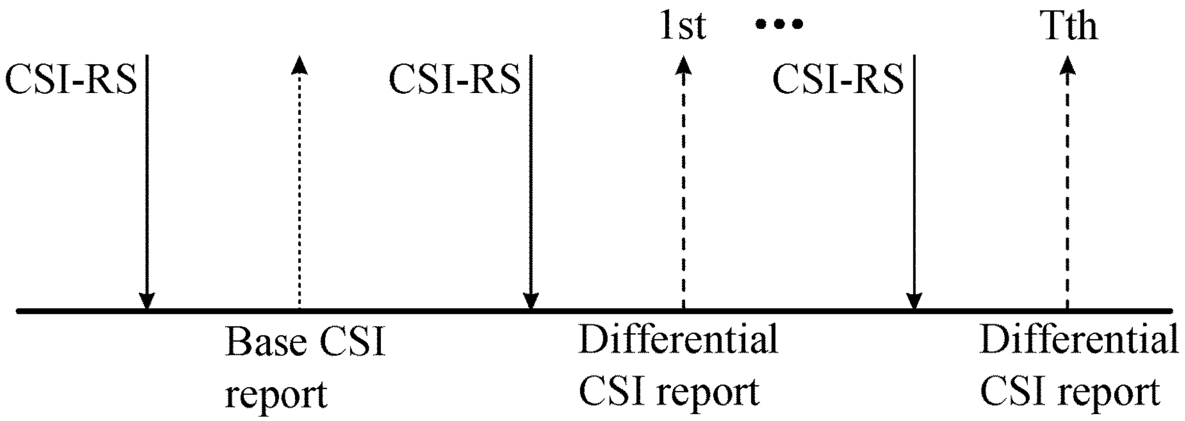

In certain aspects, a UE receives an indication (e.g., via RRC) from a network entity indicating a predefined time period (T). As illustrated in FIG. 9A and FIG. 9B, the predefined time period corresponds to a time duration for transmission of a base CSI report and one or more differential CSI reports based on the base CSI report/previous CSI reports. After the predefined time period, in response to any signaling triggering the UE to transmit a CSI report to the network entity, the UE generates and transmits a new base CSI report.

In certain aspects, the predefined time period has a fixed value. In one example, the predefined time period is based a frequency band (i.e., the predefined time period can be different per band). In another example, the predefined time period is based a capability of the UE (i.e., the predefined time period can be different for different UE capability). In another example, the predefined time period is based on a CSI report quantity (i.e., the predefined time period can be different for different CSI report quantity).

In certain aspects, a UE receives an indication (along with semi persistent CSI report activation) via a MAC CE from a network entity indicating whether to reset a differential CSI report procedure or send a differential CSI report, on receiving signaling triggering the UE to transmit a CSI report to the network entity. When the indication indicates the reset of the differential CSI report procedure, the UE transmits a new base CSI report to the network entity on receiving the signaling.

In certain aspects, a UE receives a DCI having a new DCI field indicating a predefined time period. In certain aspects, the DCI further indicates whether to reset a differential CSI report procedure or send a differential CSI report, on receiving signaling triggering the UE to transmit a CSI report to the network entity. In certain aspects, the DCI field (e.g., DCI bit field) may be different according to different RRC settings (e.g., for wideband, sub band, with precoding matrix indicator (PMI), or without PMI).

In certain aspects, a UE may determine a performance based on a base CSI report and differential CSI reports. When the UE may determine that the base CSI report/differential CSI reports may lead to large performance loss (e.g., due to quantization error or channel changing), the UE may transmit to a network entity a predefined format via UCI (instead of a conventional CSI feedback) to report the performance loss. The network entity may then send an indication to the UE indicating a reset of a differential CSI report procedure.

Example Retransmission of CSI Reports

Aspects of the present disclosure provide apparatuses, methods, processing systems, and computer readable mediums for managing retransmission of base CSI reports and differential CSI reports. Retransmissions, as described herein, may increase reliability and offer some level of protection that base and/or differential CSI reports will be successfully received.

Figure 10:
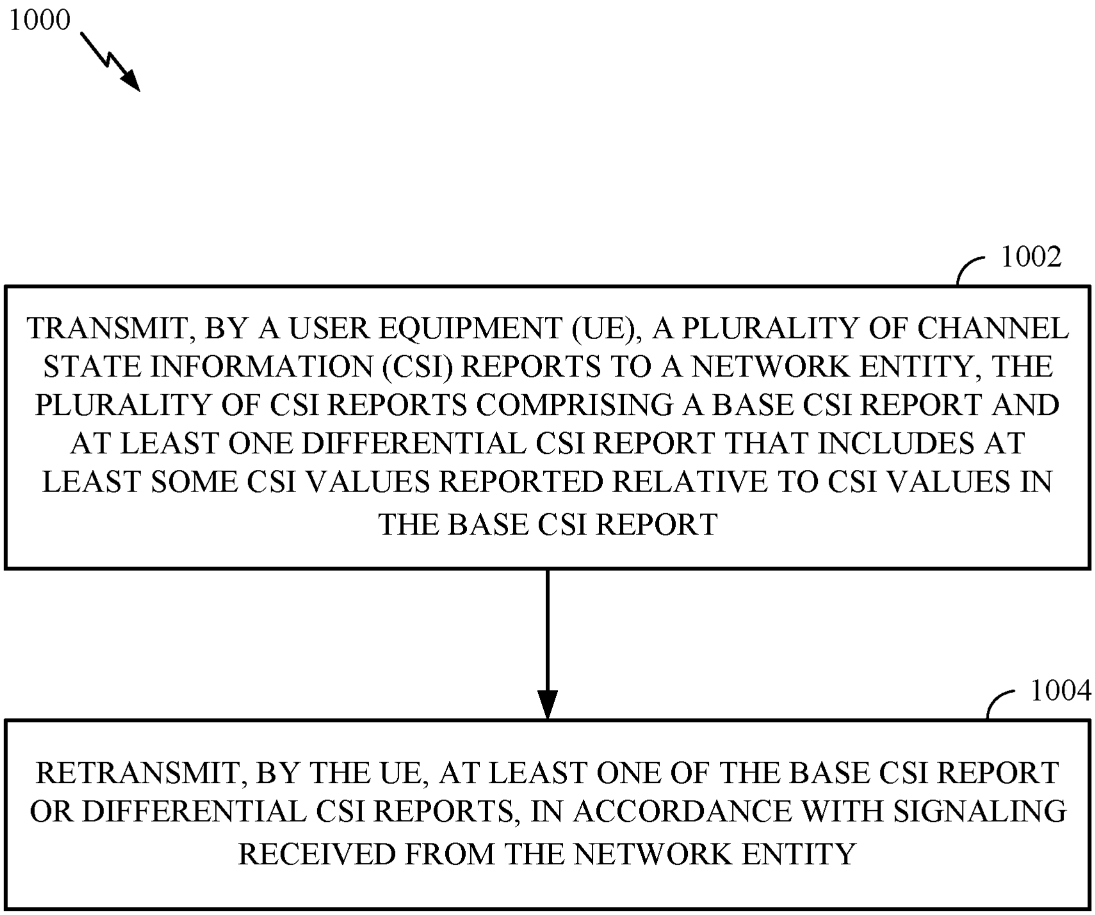
FIG. 10 is a flow diagram illustrating example operations for wireless communications by a UE, in accordance with certain aspects of the present disclosure.

FIG. 10 is a flow diagram illustrating example operations 1000 for wireless communication by a UE, in accordance with certain aspects of the present disclosure. The operations 1000 may be performed, for example, by the UE 120*a* in the wireless communication network 100. The operations 1000 may be implemented as software components that are executed and run on one or more processors (e.g., the controller/processor 280 of FIG. 2). Further, the transmission and reception of signals by the UE in operations 1000 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1000 begin, at 1002, by transmitting a plurality of CSI reports to a network entity. The plurality of CSI reports includes a base CSI report and at least one differential CSI report. The at least one differential CSI report includes at least some CSI values reported relative to CSI values in the base CSI report. For example, the UE may transmit the plurality of CSI reports to the network entity using antenna(s) and transmitter/transceiver components of the UE 120*a* shown in FIG. 1 or FIG. 2 and/or of the apparatus shown in FIG. 14.

At 1004, the UE retransmits at least one of the base CSI report or differential CSI reports, in accordance with signaling received from the network entity. For example, the UE may retransmit the at least one of the base CSI report or the differential CSI reports using antenna(s) and transmitter/transceiver components of the UE 120*a* shown in FIG. 1 or FIG. 2 and/or of the apparatus shown in FIG. 14.

Figure 11:
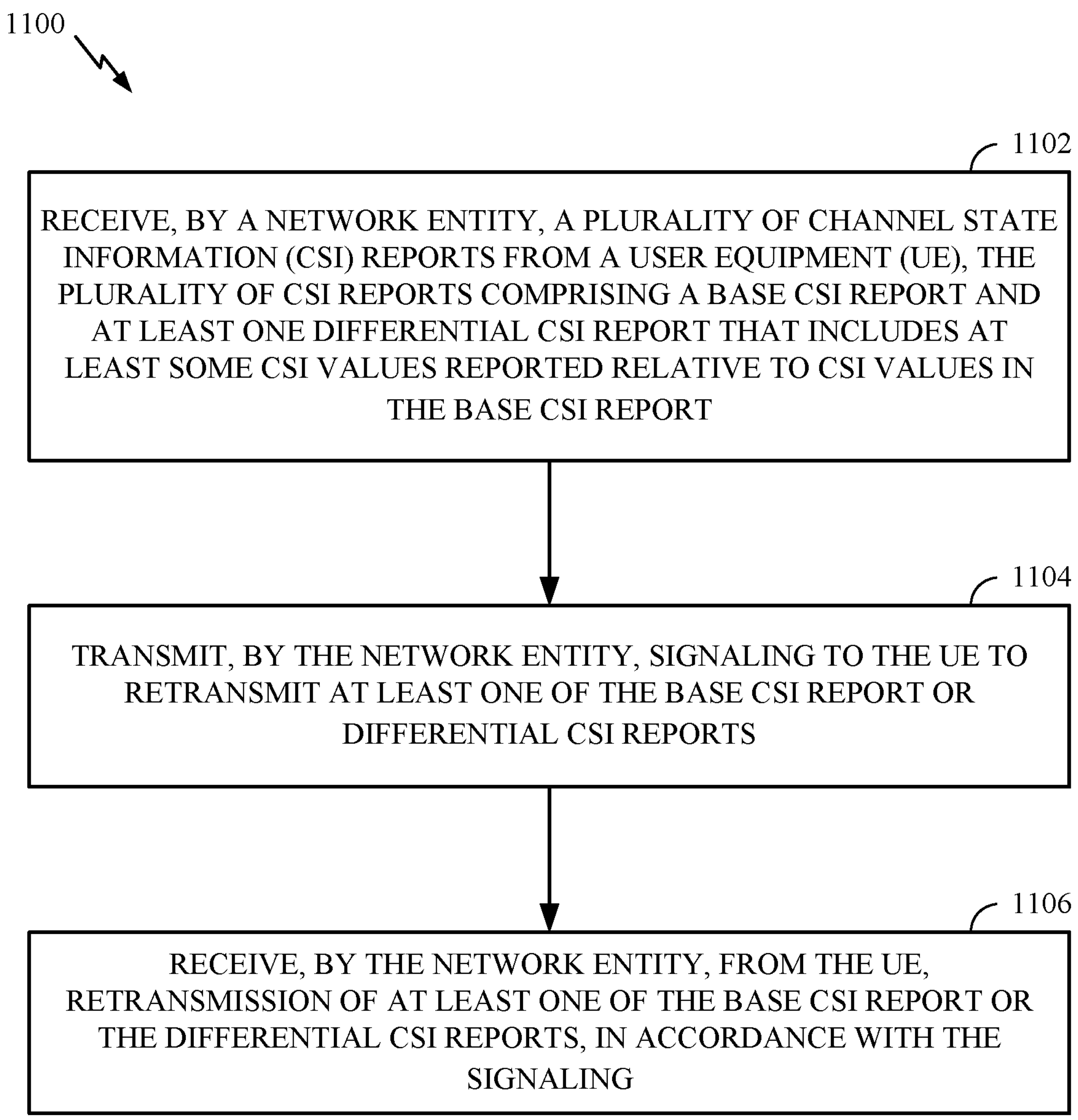
FIG. 11 is a flow diagram illustrating example operations for wireless communications by a network entity, in accordance with certain aspects of the present disclosure.

FIG. 11 is a flow diagram illustrating example operations 1100 for wireless communication by a network entity, in accordance with certain aspects of the present disclosure. The operations 1100 may be performed, for example, by a network entity (e.g., such as the BS 110*a* in the wireless communication network 100). The operations 1100 may be implemented as software components that are executed and run on one or more processors (e.g., the controller/processor 240 of FIG. 2). Further, the transmission and reception of signals by the network entity in operations 1100 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1100 begin, at 1102, by receiving a plurality of CSI reports from a UE. The plurality of CSI reports includes a base CSI report and at least one differential CSI report. The at least one differential CSI report includes at least some CSI values reported relative to CSI values in the base CSI report. For example, the network entity may receive the plurality of CSI reports from the UE using antenna(s) and receive/transceiver components of the BS 110*a* shown in FIG. 1 or FIG. 2 and/or of the apparatus shown in FIG. 15.

At 1104, the network entity transmits signaling to the UE to retransmit at least one of the base CSI report or differential CSI reports. For example, the network entity may transmit the signaling to the UE using antenna(s) and transmitter/transceiver components of the BS 110*a* shown in FIG. 1 or FIG. 2 and/or of the apparatus shown in FIG. 15.

At 1106, the network entity receives from the UE retransmission of at least one of the base CSI report or the differential CSI reports, in accordance with the signaling. For example, the network entity may receive the retransmission of the at least one of the base CSI report or the differential CSI reports using antenna(s) and receiver/transceiver components of the BS 110*a* shown in FIG. 1 or FIG. 2 and/or of the apparatus shown in FIG. 15.

Figure 12:
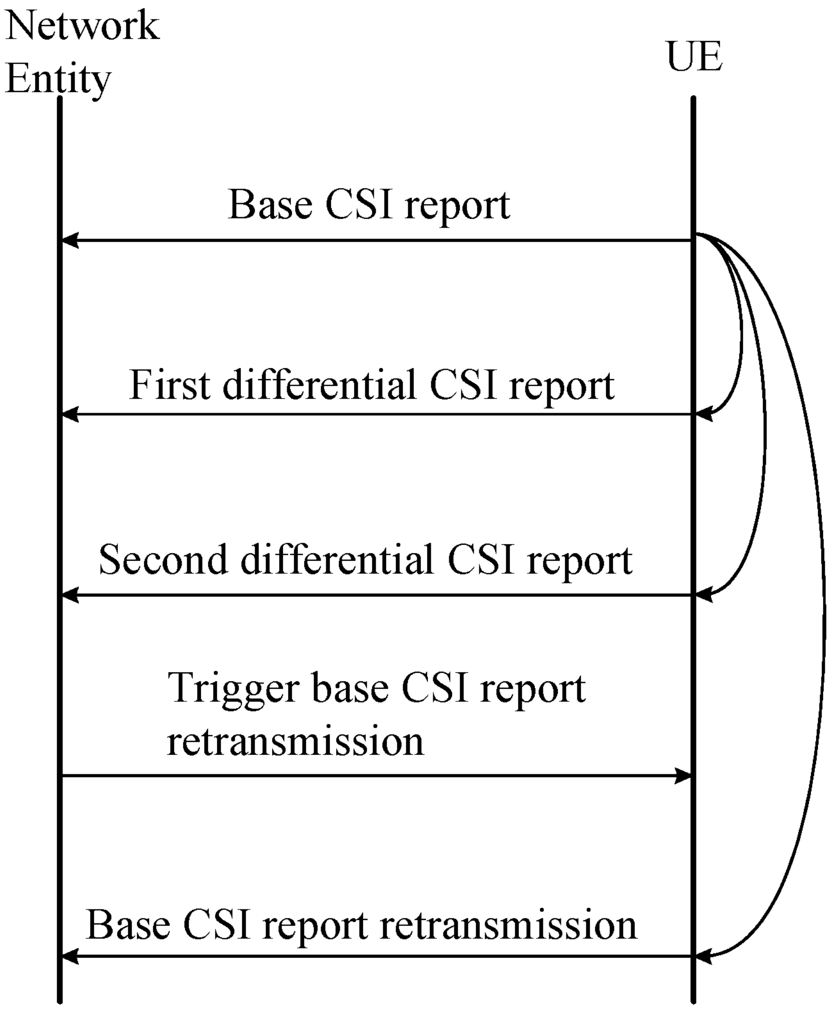
FIG. 12 is a call flow diagram illustrating example signaling for retransmitting a base CSI report or differential CSI reports, in accordance with certain aspects of the present disclosure.

The operations shown in FIGS. 10 and 11 may be understood with reference to FIG. 12.

As illustrated in FIG. 12, a UE (e.g., the UE 120*a* shown in FIG. 1 or FIG. 2) sends a base CSI report, a first CSI differential report, and a second CSI differential report to a network entity (e.g., the BS 110*a* shown in FIG. 1 or FIG. 2). The network entity sends an indication to the UE indicating retransmission of the base CSI report. The UE then retransmits the base CSI report to the network entity, in response to the indication.

In certain aspects, the indication may indicate to retransmit a latest differential CSI report. The UE may then retransmit the second differential CSI report to the network entity. In certain aspects, the indication may indicate to retransmit a specific CSI report (e.g., the first differential CSI report). The UE may then retransmit the first differential CSI report to the network entity.

In certain aspects, the indication may indicate to retransmit the base CSI report and/or the differential CSI reports by a predefined factor (e.g., 2). The network entity may configure the predefined factor. The UE may then twice retransmit the base CSI report and/or the differential CSI reports to the network entity.

In certain aspects, the indication may indicate a same priority for the base CSI report and/or the differential CSI reports as a hybrid automatic repeat request (HARQ) transmission, during uplink control information (UCI) physical uplink shared channel (PUSCH) multiplexing. For example, during retransmission of the base CSI report and/or the differential CSI reports, the base CSI report and/or the differential CSI reports may have the same priority as the HARQ transmission during the UCI-PUSCH multiplexing.

In certain aspects, the indication may indicate a same priority for the base CSI report and/or the differential CSI reports as a configured grant (CG)-UCI, during UCI PUSCH multiplexing. For example, during retransmission of the base CSI report and/or the differential CSI reports, the base CSI report and/or the differential CSI reports may have the same priority as the CG-UCI during the UCI-PUSCH multiplexing.

In certain aspects, the indication may indicate a prioritization rule for transmitting uplink transmissions. The prioritization rule may first prioritize a HARQ transmission, and subsequently prioritize a CG-UCI, the retransmission of the at least one of the base CSI report or differential CSI reports and other CSI reports. For example, the prioritization rule may prioritize the HARQ transmission over all other uplink transmissions. The prioritization rule may prioritize the CG-UCI over all other uplink transmissions except the HARQ transmission. The prioritization rule may prioritize the retransmission of the at least one of the base CSI report or differential CSI reports over all other uplink transmissions except the HARQ transmission and the CG-UCI.

Example Wireless Communication Devices

Figure 13:
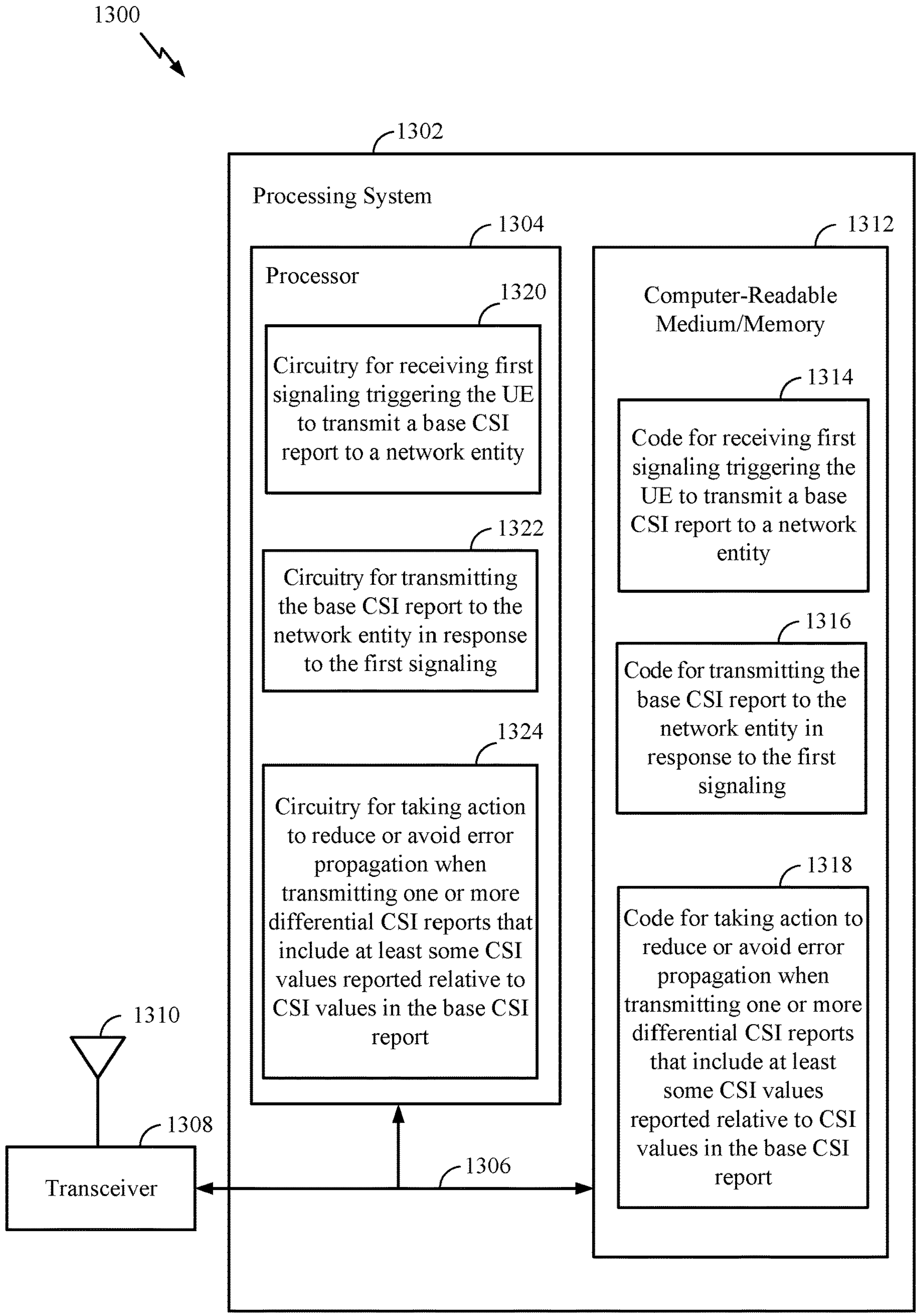
FIG. 13 illustrates a communications device that may include various components configured to perform operations for the techniques disclosed herein, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 6. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 6, or other operations for performing the various techniques discussed herein. In certain aspects, computer-readable medium/memory 1312 stores code 1314 for receiving, code 1316 for transmitting, and code 1318 for taking action. The code 1314 for receiving may include code for receiving first signaling triggering the UE to transmit a base CSI report to a network entity. The code 1316 for transmitting may include code for transmitting the base CSI report to the network entity in response to the first signaling. The code 1318 for taking action may include code for taking action to reduce or avoid error propagation when transmitting one or more differential CSI reports that include at least some CSI values reported relative to CSI values in the base CSI report.

The processor 1304 may include circuitry configured to implement the code stored in the computer-readable medium/memory 1312, such as for performing the operations illustrated in FIG. 6, as well as other operations for performing the various techniques discussed herein. For example, the processor 1304 includes circuitry 1320 for receiving, circuitry 1322 for transmitting, and circuitry 1324 for taking action. The circuitry 1320 for receiving may include circuitry for receiving first signaling triggering the UE to transmit a base CSI report to a network entity. The circuitry 1322 for transmitting may include circuitry for transmitting the base CSI report to the network entity in response to the first signaling. The circuitry 1324 for taking action may include circuitry for taking action to reduce or avoid error propagation when transmitting one or more differential CSI reports that include at least some CSI values reported relative to CSI values in the base CSI report.

Figure 14:
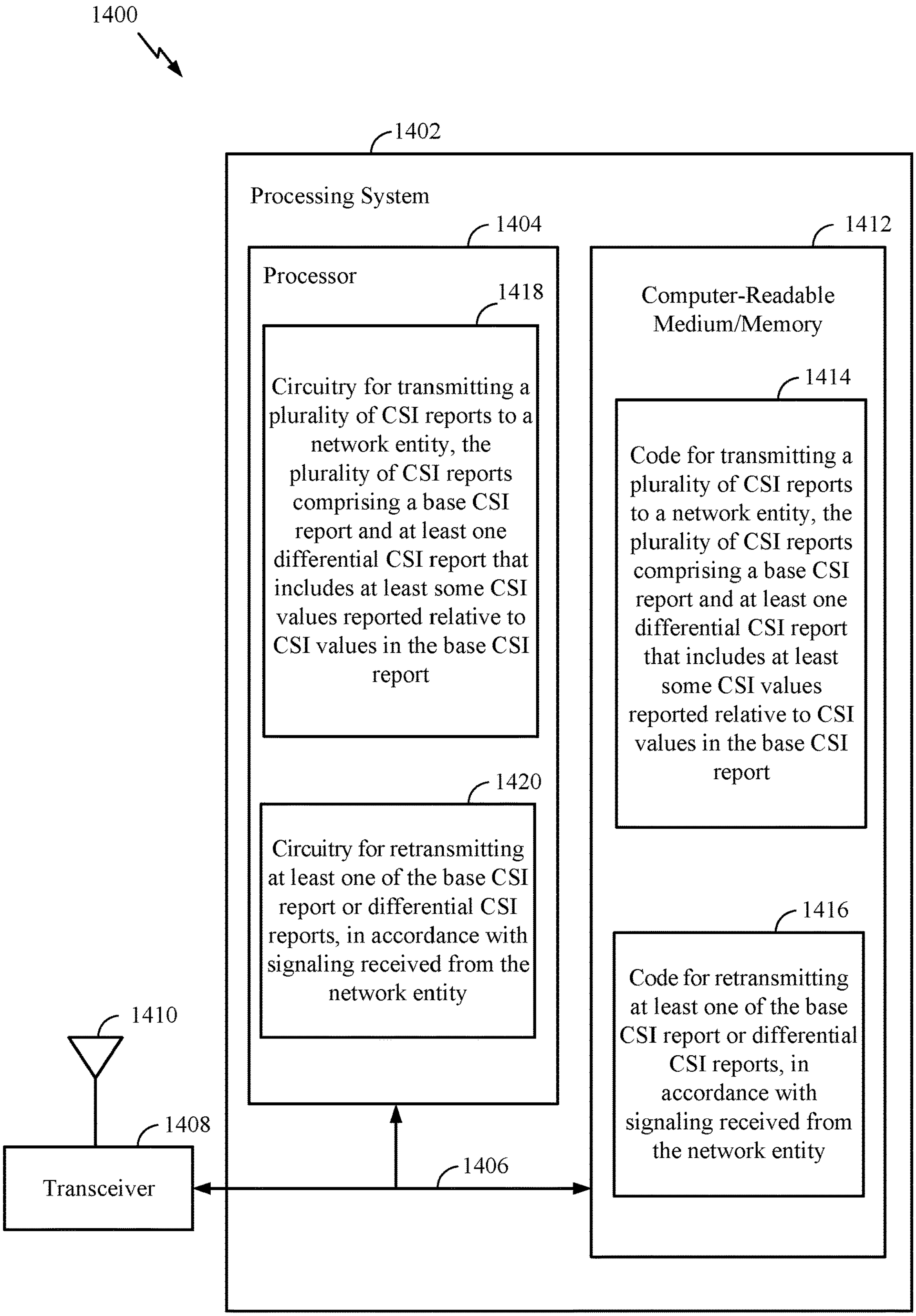
FIG. 14 illustrates a communications device that may include various components configured to perform operations for the techniques disclosed herein, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 10, or other operations for performing the various techniques discussed herein. In certain aspects, computer-readable medium/memory 1412 stores code 1414 for transmitting and code 1416 for retransmitting. The code 1414 for transmitting may include code for transmitting a plurality of CSI reports to a network entity. The plurality of CSI reports includes a base CSI report and at least one differential CSI report that includes at least some CSI values reported relative to CSI values in the base CSI report. The code 1416 for retransmitting may include code for retransmitting at least one of the base CSI report or differential CSI reports, in accordance with signaling received from the network entity.

The processor 1404 may include circuitry configured to implement the code stored in the computer-readable medium/memory 1412, such as for performing the operations illustrated in FIG. 10, as well as other operations for performing the various techniques discussed herein. For example, the processor 1404 includes circuitry 1418 for transmitting and circuitry 1420 for retransmitting. The circuitry 1418 for sending may include circuitry for transmitting a plurality of CSI reports to a network entity. The plurality of CSI reports includes a base CSI report and at least one differential CSI report that includes at least some CSI values reported relative to CSI values in the base CSI report. The circuitry 1420 for retransmitting may include circuitry for retransmitting at least one of the base CSI report or differential CSI reports, in accordance with signaling received from the network entity.

Figure 15:
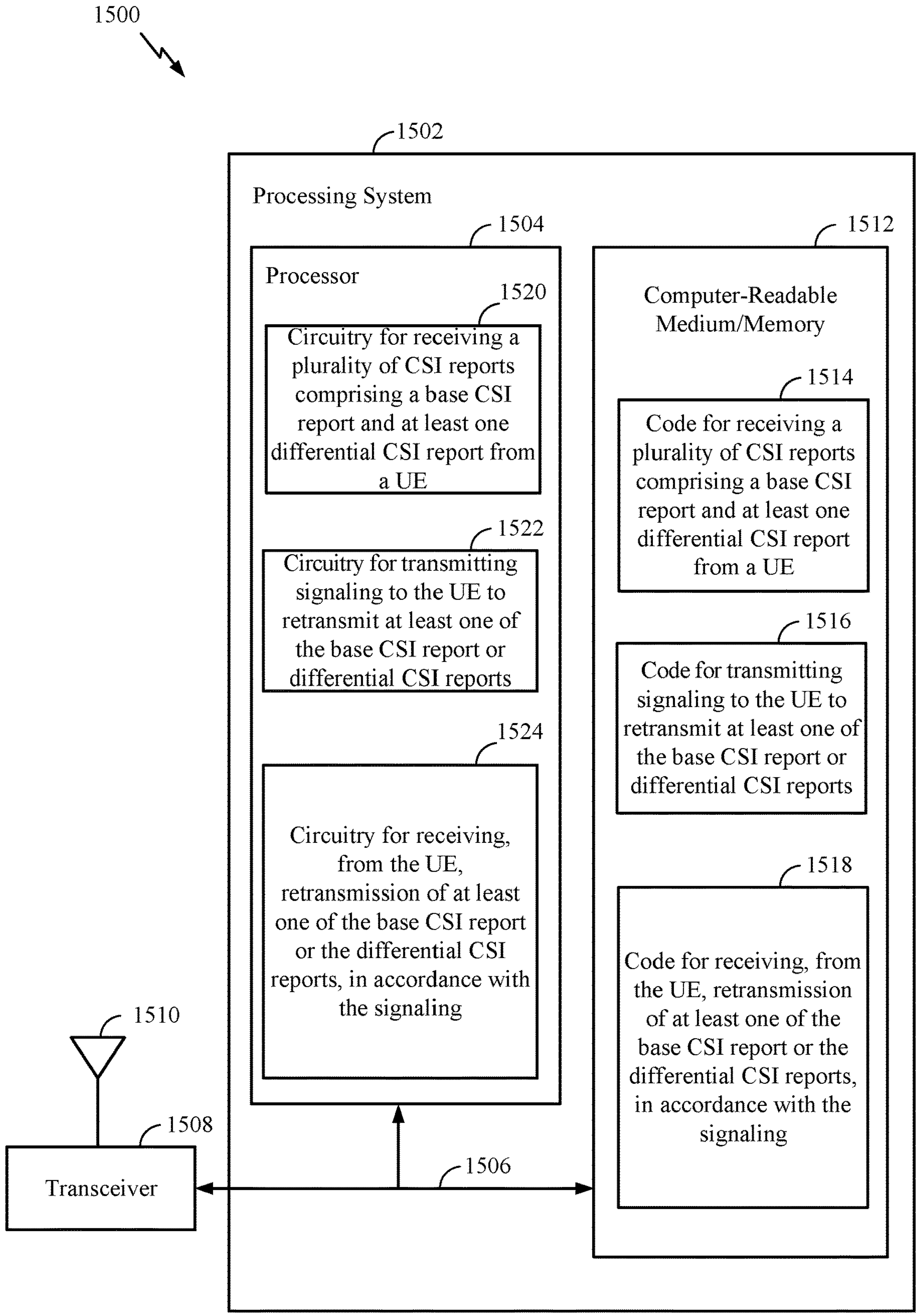
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., a computer-executable code) that when executed by the processor 1504, cause the processor 1504 to perform the operations illustrated in FIG. 11, or other operations for performing the various techniques discussed herein. In certain aspects, computer-readable medium/memory 1512 stores code 1514 for receiving, code 1516 for transmitting, and code 1518 for receiving. The code 1514 for receiving may include code for receiving a plurality of CSI reports from a UE. The plurality of CSI reports includes a base CSI report and at least one differential CSI report that includes at least some CSI values reported relative to CSI values in the base CSI report. The code 1516 for transmitting may include code for transmitting signaling to the UE to retransmit at least one of the base CSI report or differential CSI reports. The code 1518 for receiving may include code for receiving, from the UE, retransmission of at least one of the base CSI report or the differential CSI reports, in accordance with the signaling.

The processor 1504 may include circuitry configured to implement the code stored in the computer-readable medium/memory 1512, such as for performing the operations illustrated in FIG. 11, as well as other operations for performing the various techniques discussed herein. For example, the processor 1504 includes circuitry 1520 for receiving, circuitry 1522 for transmitting, and circuitry 1524 for receiving. The circuitry 1520 for receiving may include circuitry for receiving a plurality of CSI reports from a UE. The circuitry 1522 for transmitting may include circuitry for transmitting signaling to the UE to retransmit at least one of the base CSI report or differential CSI reports. The circuitry 1524 for receiving may include circuitry for receiving, from the UE, retransmission of at least one of the base CSI report or the differential CSI reports, in accordance with the signaling.

Example Aspects

Implementation examples are described in the following numbered aspects.

In a first aspect, a method for wireless communications by a user equipment (UE), comprising: receiving first signaling triggering the UE to transmit a base channel state information (CSI) report to a network entity; transmitting the base CSI report to the network entity in response to the first signaling; and taking action to reduce or avoid error propagation when transmitting one or more differential CSI reports that include at least some CSI values reported relative to CSI values in the base CSI report.

In a second aspect, alone or in combination with the first aspect, receiving second signaling triggering the UE to transmit a differential CSI report to the network entity; and calculating the differential CSI report based on at least one of: a fixed reference rule or a scheduling based reference rule.

In a third aspect, alone or in combination with one or more of the first and second aspects, the fixed reference rule indicates to: calculate the differential CSI report based on a predefined reference CSI report, wherein the predefined reference CSI report corresponds to a latest base CSI report, a latest differential CSI report, or a CSI report associated with a predefined ID; and transmit the differential CSI report to the network entity.

In a fourth aspect, alone or in combination with one or more of the first through third aspects, the fixed reference rule further indicates to skip the differential CSI report, in response to the second signaling, if the predefined reference CSI report has been dropped.

In a fifth aspect, alone or in combination with one or more of the first through fourth aspects, the scheduling based reference rule is applicable when a reference CSI report for the differential CSI report is dropped due to a collision with other channels known to both the UE and the network entity, and wherein the reference CSI report corresponds to a latest base CSI report, a latest differential CSI report, or a CSI report associated with a predefined ID.

In a sixth aspect, alone or in combination with one or more of the first through fifth aspects, the scheduling based reference rule indicates to: calculate the differential CSI report based on a latest valid base CSI report or a latest valid differential CSI report; and transmit the differential CSI report to the network entity.

In a seventh aspect, alone or in combination with one or more of the first through sixth aspects, the scheduling based reference rule indicates to: drop the differential CSI report; and transmit a new base CSI report to the network entity.

In an eighth aspect, alone or in combination with one or more of the first through seventh aspects, receiving a downlink control information (DCI) indicating to reset a differential CSI report procedure or skip the differential CSI report, when the reference CSI report for the differential CSI report is dropped; and transmitting a new base CSI report or skipping the differential CSI report to the network entity, based on the DCI.

In a ninth aspect, alone or in combination with one or more of the first through eighth aspects, the taking action comprises: receiving second signaling triggering the UE to transmit a differential CSI report to the network entity; and dropping the differential CSI report, in response to the second signaling, if a time gap between transmissions of the base CSI report and the differential CSI report is less than a first threshold or more than a second threshold.

In a tenth aspect, alone or in combination with one or more of the first through ninth aspects, the taking action comprises: receiving second signaling triggering the UE to transmit a differential CSI report to the network entity; and transmitting a new base CSI report instead of the differential CSI report, in response to the second signaling, if a time gap between transmissions of the base CSI report and the differential CSI report is less than or more than a second threshold.

In an eleventh aspect, alone or in combination with one or more of the first through tenth aspects, receiving scheduling information indicating a differential CSI report procedure reset via at least one of: a radio resource control (RRC), a medium access control (MAC) control element (CE), or a downlink control information (DCI), wherein the UE replaces a reference CSI report with a new base CSI report based on the scheduling information.

In a twelfth aspect, alone or in combination with one or more of the first through eleventh aspects, receiving signaling indicating a predefined time period corresponding to a time duration for transmission of the base CSI report and the one or more differential CSI reports, wherein the UE transmits a new base CSI report after the predefined time period on receiving signaling triggering the UE to transmit a CSI report to the network entity.

In a thirteenth aspect, alone or in combination with one or more of the first through twelfth aspects, the predefined time period has a fixed value and is based on at least one of: a frequency band, a capability of the UE, or a CSI report quantity.

In a fourteenth aspect, alone or in combination with one or more of the first through thirteenth aspects, receiving an indication via a medium access control (MAC) control element (CE) indicating whether to reset a differential CSI report procedure or send a differential CSI report, on receiving second signaling triggering the UE to transmit a CSI report to the network entity, wherein the UE transmits a new base CSI report when the indication indicates the reset.

In a fifteenth aspect, alone or in combination with one or more of the first to fourteenth aspects, receiving a downlink control information (DCI) having a field indicating a predefined time period corresponding to a time duration for transmission of the base CSI report and the one or more differential CSI reports, wherein the DCI further indicates whether to reset a differential CSI report procedure or send a differential CSI report, on receiving second signaling triggering the UE to transmit a CSI report to the network entity, wherein the UE transmits a new base CSI report when the DCI indicates the reset.

In a sixteenth aspect, alone or in combination with one or more of the first to fifteenth aspects, transmitting, to the network entity, a predefined format via uplink control information (UCI) to report a performance loss caused due to the one or more differential CSI reports; and receiving signaling, from the network entity, indicating a reset of a differential CSI report procedure.

In a seventeenth aspect, a method for wireless communications by a user equipment (UE), comprising: transmitting a plurality of channel state information (CSI) reports to a network entity, the plurality of CSI reports comprising a base CSI report and at least one differential CSI report that includes at least some CSI values reported relative to CSI values in the base CSI report; and retransmitting at least one of the base CSI report or differential CSI reports, in accordance with signaling received from the network entity.

In an eighteenth aspect, alone or in combination with the seventeenth aspect, the signaling indicates to retransmit at least one of: a latest base CSI report, a latest differential CSI report, or a specific CSI report from the plurality of CSI reports.

In a nineteenth aspect, alone or in combination with one or more of the seventeenth and eighteenth aspects, the signaling indicates to retransmit at least one of the base CSI report or the differential CSI reports by a predefined factor.

In a twentieth aspect, alone or in combination with one or more of the seventeenth through nineteenth aspects, the signaling indicates a same priority for the differential CSI reports as a hybrid automatic repeat request (HARQ) transmission during uplink control information (UCI) physical uplink shared channel (PUSCH) multiplexing.

In a twenty-first aspect, alone or in combination with one or more of the seventeenth through twentieth aspects, the signaling indicates a same priority for the differential CSI reports as a configured grant (CG)-uplink control information (UCI) during UCI physical uplink shared channel (PUSCH) multiplexing.

In a twenty-second aspect, alone or in combination with one or more of the seventeenth through twenty-first aspects, the signaling indicates a prioritization rule for transmitting uplink transmissions, and wherein the prioritization rule prioritizes a hybrid automatic repeat request (HARQ) transmission; subsequently prioritizes a configured grant (CG)-uplink control information (UCI); subsequently prioritizes retransmission of the at least one of the base CSI report or differential CSI reports; and subsequently prioritizes other CSI reports.

In a twenty-third aspect, a method for wireless communications by a network entity, comprising: receiving a plurality of channel state information (CSI) reports from a user equipment (UE), the plurality of CSI reports comprising a base CSI report and at least one differential CSI report that includes at least some CSI values reported relative to CSI values in the base CSI report; transmitting signaling to the UE to retransmit at least one of the base CSI report or differential CSI reports; and receiving, from the UE, retransmission of at least one of the base CSI report or the differential CSI reports, in accordance with the signaling.

In a twenty-fourth aspect, alone or in combination with the twenty-third aspect, the signaling indicates to retransmit at least one of: a latest base CSI report, a latest differential CSI report, or a specific CSI report from the plurality of CSI reports.

In a twenty-fifth aspect, alone or in combination with one or more of the twenty-third and twenty-fourth aspects, the signaling indicates to retransmit at least one of the base CSI report or the differential CSI reports by a predefined factor.

An apparatus for wireless communication, comprising at least one processor; and a memory coupled to the at least one processor, the memory comprising code executable by the at least one processor to cause the apparatus to perform the method of any of the first through twenty-fifth aspects.

An apparatus comprising means for performing the method of any of the first through twenty-fifth aspects.

A computer readable medium storing computer executable code thereon for wireless communications that, when executed by at least one processor, cause an apparatus to perform the method of any of the first through twenty-fifth aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6, 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:

receiving first signaling triggering the UE to transmit a base channel state information (CSI) report to a network entity;

transmitting the base CSI report to the network entity in response to the first signaling;

taking action to reduce or avoid error propagation when transmitting one or more differential CSI reports that include at least some CSI values reported relative to CSI values in the base CSI report;

transmitting, to the network entity, a predefined format via uplink control information (UCI) to report a performance loss caused due to the one or more differential CSI reports; and receiving signaling, from the network entity, indicating a reset of a differential CSI report procedure.

2. The method of claim 1, further comprising:

receiving second signaling triggering the UE to transmit a differential CSI report to the network entity; and calculating the differential CSI report based on at least one of: a fixed reference rule or a scheduling based reference rule.

3. The method of claim 2, wherein the fixed reference rule indicates to:

calculate the differential CSI report based on a predefined reference CSI report, wherein the predefined reference CSI report corresponds to a latest base CSI report, a latest differential CSI report, or a CSI report associated with a predefined ID; and transmit the differential CSI report to the network entity.

4. The method of claim 3, wherein the fixed reference rule further indicates to skip the differential CSI report, in response to the second signaling, if the predefined reference CSI report has been dropped.

5. The method of claim 2, wherein the scheduling based reference rule is applicable when a reference CSI report for the differential CSI report is dropped due to a collision with other channels known to both the UE and the network entity, and wherein the reference CSI report corresponds to a latest base CSI report, a latest differential CSI report, or a CSI report associated with a predefined ID.

6. The method of claim 5, wherein the scheduling based reference rule indicates to:

calculate the differential CSI report based on a latest valid base CSI report or a latest valid differential CSI report; and transmit the differential CSI report to the network entity.

7. The method of claim 5, wherein the scheduling based reference rule indicates to:

drop the differential CSI report; and transmit a new base CSI report to the network entity.

8. The method of claim 5, further comprising:

receiving a downlink control information (DCI) indicating to reset a differential CSI report procedure or skip the differential CSI report, when the reference CSI report for the differential CSI report is dropped; and transmitting a new base CSI report or skipping the differential CSI report to the network entity, based on the DCI.

9. The method of claim 1, wherein the taking action comprises:

receiving second signaling triggering the UE to transmit a differential CSI report to the network entity; and dropping the differential CSI report, in response to the second signaling, if a time gap between transmissions of the base CSI report and the differential CSI report is less than a first threshold or more than a second threshold.

10. The method of claim 1, wherein the taking action comprises:

receiving second signaling triggering the UE to transmit a differential CSI report to the network entity; and transmitting a new base CSI report instead of the differential CSI report, in response to the second signaling, if a time gap between transmissions of the base CSI report and the differential CSI report is less than or more than a second threshold.

11. The method of claim 1, further comprising receiving scheduling information indicating a differential CSI report procedure reset via at least one of: a radio resource control (RRC), a medium access control (MAC) control element (CE), or a downlink control information (DCI), wherein the UE replaces a reference CSI report with a new base CSI report based on the scheduling information.

12. The method of claim 1, further comprising receiving signaling indicating a predefined time period corresponding to a time duration for transmission of the base CSI report and the one or more differential CSI reports, wherein the UE transmits a new base CSI report after the predefined time period on receiving signaling triggering the UE to transmit a CSI report to the network entity.

13. The method of claim 12, wherein the predefined time period has a fixed value and is based on at least one of: a frequency band, a capability of the UE, or a CSI report quantity.

14. The method of claim 1, further comprising receiving an indication via a medium access control (MAC) control element (CE) indicating whether to reset a differential CSI report procedure or send a differential CSI report, on receiving second signaling triggering the UE to transmit a CSI report to the network entity, wherein the UE transmits a new base CSI report when the indication indicates the reset.

15. The method of claim 1, further comprising receiving a downlink control information (DCI) having a field indicating a predefined time period corresponding to a time duration for transmission of the base CSI report and the one or more differential CSI reports, wherein the DCI further indicates whether to reset a differential CSI report procedure or send a differential CSI report, on receiving second signaling triggering the UE to transmit a CSI report to the network entity, wherein the UE transmits a new base CSI report when the DCI indicates the reset.

16. An apparatus for wireless communications by a user equipment (UE), comprising:
- a memory comprising instructions; and
- one or more processors configured, individually or in any combination, to execute the instructions to cause the UE to:
  - receive first signaling triggering the UE to transmit a base channel state information (CSI) report to a network entity;
  - transmit the base CSI report to the network entity in response to the first signaling;
  - take action to reduce or avoid error propagation when transmitting one or more differential CSI reports that include at least some CSI values reported relative to CSI values in the base CSI report;
  - transmit, to the network entity, a predefined format via uplink control information (UCI) to report a performance loss caused due to the one or more differential CSI reports; and
  - receive signaling, from the network entity, indicating a reset of a differential CSI report procedure.

17. The apparatus of claim 16, wherein the one or more processors are configured, individually or in any combination, to execute the instructions to cause the UE to:
- receive second signaling triggering the UE to transmit a differential CSI report to the network entity; and
- calculate the differential CSI report based on at least one of: a fixed reference rule or a scheduling based reference rule.

18. The apparatus of claim 17, wherein the fixed reference rule indicates to:
- calculate the differential CSI report based on a predefined reference CSI report, wherein the predefined reference CSI report corresponds to a latest base CSI report, a latest differential CSI report, or a CSI report associated with a predefined ID; and
- transmit the differential CSI report to the network entity.

19. The apparatus of claim 18, wherein the fixed reference rule further indicates to skip the differential CSI report, in response to the second signaling, if the predefined reference CSI report has been dropped.

20. The apparatus of claim 18, wherein the scheduling based reference rule is applicable when a reference CSI report for the differential CSI report is dropped due to a collision with other channels known to both the UE and the network entity, and wherein the reference CSI report corresponds to a latest base CSI report, a latest differential CSI report, or a CSI report associated with a predefined ID.

* * * * *